United States Patent [19]

Jostlein

[11] Patent Number: 5,647,136

[45] Date of Patent: Jul. 15, 1997

[54] AUTOMATIC BALL BAR FOR A COORDINATE MEASURING MACHINE

[75] Inventor: Hans Jostlein, Naperville, Ill.

[73] Assignee: Universities Research Association, Inc., Washington, D.C.

[21] Appl. No.: 500,336

[22] Filed: Jul. 10, 1995

[51] Int. Cl.[6] ............................ G01B 7/004; G01C 25/00
[52] U.S. Cl. .................................... 33/502; 73/1.79
[58] Field of Search ................. 33/502, 503; 73/1 J, 73/1 R

[56] References Cited

U.S. PATENT DOCUMENTS

| | | | |
|---|---|---|---|
| 4,263,803 | 4/1981 | Burkhardt | 73/1 J |
| 4,435,905 | 3/1984 | Bryan . | |
| 4,437,151 | 3/1984 | Hurt et al. . | |
| 4,492,036 | 1/1985 | Beckwith, Jr. . | |
| 4,763,507 | 8/1988 | Zofchak . | |
| 4,780,961 | 11/1988 | Shelton et al. | 33/503 |
| 4,819,195 | 4/1989 | Bell et al. . | |
| 4,945,501 | 7/1990 | Bell et al. . | |
| 5,052,115 | 10/1991 | Burdekin | 33/502 |
| 5,214,857 | 6/1993 | McMurtry et al. . | |
| 5,259,120 | 11/1993 | Chapman et al. | 33/502 |
| 5,430,948 | 7/1995 | Van Der Wal, III | 33/502 |

*Primary Examiner*—Christopher W. Fulton
*Attorney, Agent, or Firm*—McAndrews, Held & Malloy, Ltd.

[57] ABSTRACT

An automatic ball bar for a coordinate measuring machine determines the accuracy of a coordinate measuring machine having at least one servo drive. The apparatus comprises a first and second gauge ball connected by a telescoping rigid member. The rigid member includes a switch such that inward radial movement of the second gauge ball relative to the first gauge ball causes activation of the switch. The first gauge ball is secured in a first magnetic socket assembly in order to maintain the first gauge ball at a fixed location with respect to the coordinate measuring machine. A second magnetic socket assembly secures the second gauge ball to the arm or probe holder of the coordinate measuring machine. The second gauge ball is then directed by the coordinate measuring machine to move radially inward from a point just beyond the length of the ball bar until the switch is activated. Upon switch activation, the position of the coordinate measuring machine is determined and compared to known ball bar length such that the accuracy of the coordinate measuring machine can be determined.

10 Claims, 3 Drawing Sheets

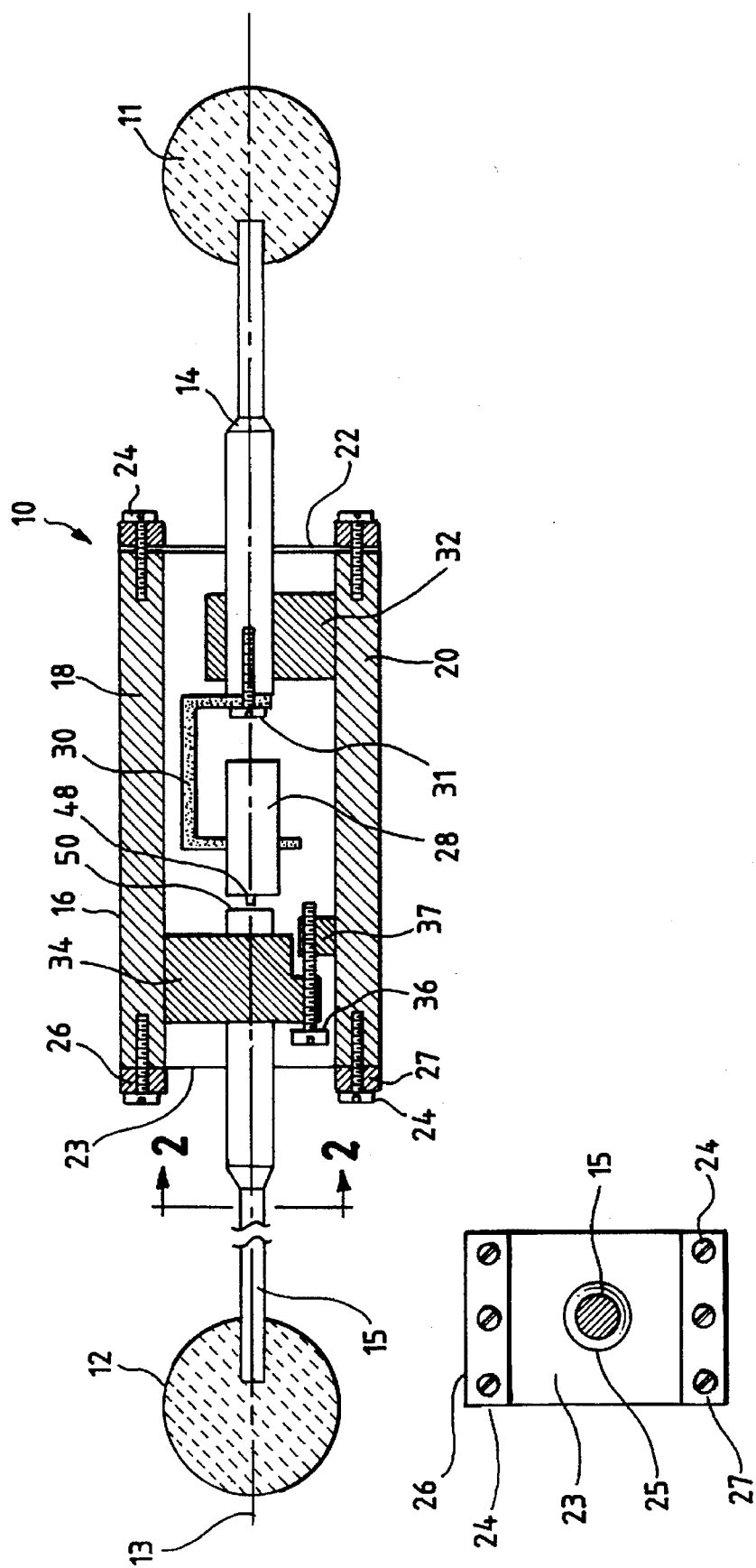

AUTOMATIC BALL BAR FOR A COORDINATE MEASURING MACHINE

This invention was made with Government support under Government Contract No. DE-AC02-76CH03000 awarded by the U.S. Department of Energy. The Government has certain rights in the invention.

FIELD OF THE INVENTION

The present invention relates generally to an apparatus and method for determining the accuracy of machines having servo motors and, more particularly, to an apparatus and method for calibration of coordinate positioning machines such as machine tools or coordinate measuring machines. Such machines typically comprise an arm (for example, a measuring probe) movable in three dimensions relative to a table or base on which, for example, a workpiece is supported. It is desirable to frequently calibrate such machines to determine the accuracy to which, for example, the probe may record surface points on a workpiece.

BACKGROUND OF THE INVENTION

Various parameters are employed to describe the accuracy of a coordinate measuring machine. The total accuracy of a coordinate measuring machine depends upon the repeatability, accuracy, and orthogonality of the machine axes. This accuracy, which is of most importance to the user, is referred to as volumetric accuracy.

Industry standards define methods to verify the volumetric accuracy of a coordinate measuring machine. One such standard is the ANSI B89 Standard. According to this standard, a test artifact is provided, constructed of two precision metal balls joined by a rigid member. When in use, this ball bar is held by an adjustable stand. The machine to be tested is programmed to measure a number of points on the surface of each of the two balls, and to calculate a center location for each ball. From this information, the apparent center-to-center ball bar length can be determined. This ball bar length is then compared to the known length of the ball bar in use. The ANSI B89 Standard calls for measuring the same ball bar in a number of different locations and angles in order to determine the entire volumetric accuracy of the coordinate measuring machine under test.

A known device for performing such a calibration operation is described in U.S. Pat. No. 4,435,905. The device comprises an elongate telescopic bar with a metal ball at each end. In use, each of the balls is retained in a magnetic socket provided on the probe holder and the workpiece table respectively. The probe holder is then driven in a circular path about the center of the ball retained in the socket on the workpiece table. A single axis transducer provided on the bar measures any variation in the center-to-center spacing of the balls, and thus determines the extent to which the probe holder path varies from its programmed circular path.

This known method and apparatus has significant drawbacks. On a typical servo-driven coordinate measuring machine, measurements are performed by positioning the coordinate measuring machine probe a short distance away from the surface under test. The probe is then activated to receive a touch signal. The coordinate measuring machine is then instructed to move the probe toward the surface under test. As soon as a contact signal is received from the probe, the Cartesian coordinates of the test surface are recorded, and motion is halted. Thus, coordinate measuring machines are not typically required to move to a predetermined space point to very high accuracy. Nor are they constructed for such tasks. In fact, the proportional/differential/integral motor control of many coordinate measuring machines have long time constants and may take several seconds to move within one or two microns of the desired location. Despite these shortcomings, existing ball bar calibration systems require the coordinate measuring machine probe holder to move precisely along a predetermined path.

In addition, existing ball bar systems often use a separate data output or computer to compare the recorded length to the actual length of the ball bar under test. These separate systems do not have access to the coordinate measuring machine motion controller or servo motor output values. While the coordinate measuring machine may not have located itself precisely at the requested location, current ball bar systems assume the location to have been reached perfectly, and attribute any discrepancy to coordinate measuring machine error.

The present invention is directed to overcoming one or more of the above-noted problems.

More specifically, an object of the present invention is to provide a coordinate measuring machine calibration method and apparatus which operates the coordinate measuring machine in the same manner it operates during a typical measurement cycle. In other words, the present invention provides a method and apparatus which do not require the coordinate measuring machine to reach a precise location, but only to record its precise location at the time of probe activation.

It is another object of the present invention to provide a ball bar calibration system which utilizes data from the coordinate measuring machine motion controller or servo motor output in determining volumetric accuracy.

It is yet another object of the present invention to provide a calibration method and apparatus capable of operating at substantially the same speed as the coordinate measuring machine is operated during a typical measurement cycle.

Other objects and advantages of the invention will become apparent upon reading the following detailed description and appended claims, and upon reference to the accompanying drawings.

SUMMARY OF THE INVENTION

In accordance with the purpose of the present invention, as embodied and broadly described herein, the apparatus for determining the accuracy of a coordinate measuring machine having at least one servo drive, comprises a first and second gauge ball connected by a telescoping rigid member. The rigid member includes a switch such that inward radial movement of the second gauge ball relative to the first gauge ball causes activation of the switch. The first gauge ball is secured in a first magnetic socket assembly in order to maintain the first gauge ball at a fixed location with respect to the coordinate measuring machine. A second magnetic socket assembly secures the second gauge ball to the arm or probe holder of the coordinate measuring machine. The second gauge ball is then directed by the coordinate measuring machine to move radially inward from a point just beyond the length of the ball bar until the switch is activated. Upon switch activation, the position of the coordinate measuring machine is determined and compared to the known ball bar length such that the accuracy of the coordinate measuring machine can be determined.

BRIEF DESCRIPTION OF THE DRAWINGS

For a more complete understanding of this invention reference should now be had to the embodiment illustrated in greater detail in the accompanying drawings and described below by way of example of the invention.

In the drawings:

FIG. 1 is a side view of the ball bar apparatus of the present invention.

FIG. 2 is an end view of the apparatus of FIG. 1 taken along line 2—2.

Figure 3:
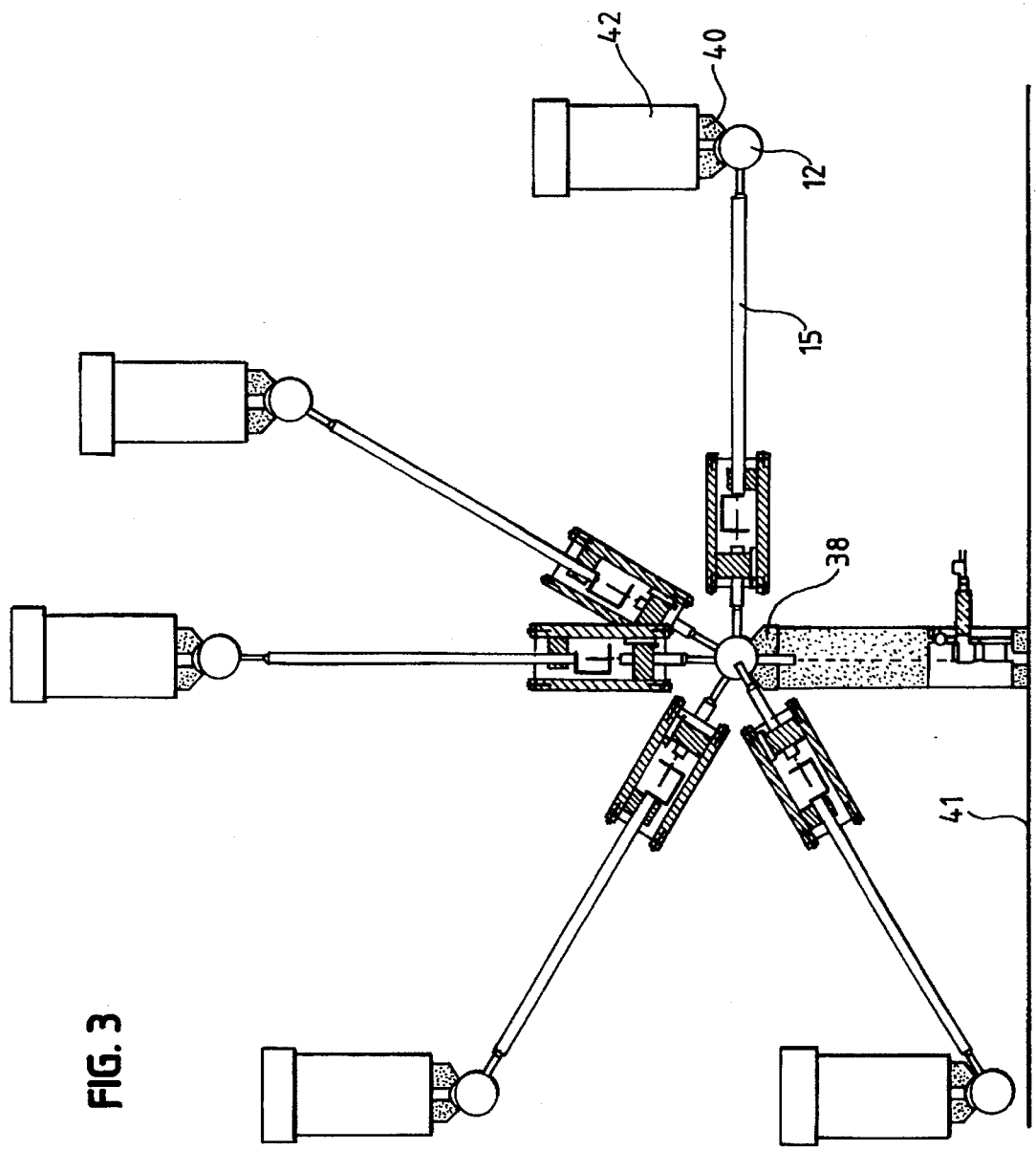
FIG. 3 is side view of one embodiment of the present invention shown with the arm of the coordinate measuring machine in five different locations.

The following reference characters are used in the FIGS:

10 ball bar
11 gauge ball
12 gauge ball
13 axis
14 rigid member
15 rigid member
16 switch assembly
18 upper housing
20 lower housing
22 leaf spring
23 leaf spring
24 fastener
25 opening
26 end cap
27 end cap
28 switch
30 bracket
31 fastener
32 support
34 support
36 limit screw
37 stop
38 magnetic socket assembly
40 magnetic socket assembly
41 workpiece table
42 arm
43 base
44 magnets
46 pads
48 switch tip
50 end surface

DETAILED DESCRIPTION OF THE PREFERRED EMBODIMENTS

In the following detailed description, spatially orienting terms are used such as "left," "right," "vertical," "horizontal," and the like. It is to be understood that these terms are used for convenience of description of the preferred embodiments by reference to the drawings. These terms do not necessarily describe the absolute location in space, such as left, right, upward, downward, etc., that any part must assume.

Referring now to the drawings, FIG. 1 is a side view of the ball bar 10 of the present invention. The ball bar 10 comprises gauge balls 11, 12 connected by rigid members 14, 15 to a telescoping switch assembly 16. Gauge balls 11, 12 are preferably constructed of a hard steel alloy and have a sphericity of 0.005 inches or less. Rigid members 14, 15 are preferably constructed of steel alloy having a low thermal expansion coefficient, such as is commercially available under the brand name Invar. Alternatively, rigid members 14, 15 could be constructed of a rigid polymer or carbon fiber. Further, to cancel errors due to temperature variations, rigid members 14, 15 may be made of a material having the same thermal expansion coefficient as the material of the workpiece under test.

Switch assembly 16 comprises an upper housing 18 and lower housing 20 connected by leaf springs 22, 23. Leaf springs 22, 23 are secured to the upper and lower housings 18, 20 by fasteners 24 passing through end caps 26, 27. Leaf springs 22, 23 are preferably stamped from sheet steel of approximately 0.006 inches thickness. As shown in FIG. 2, an opening 25 in leaf spring 23 allows rigid member 15 to pass through without contact. Leaf spring 22 includes a similar opening for rigid member 14. The structure of switch assembly 16 allows rigid members 14, 15 to remain axially aligned, yet allows some radial movement between gauge balls 11, 12 along their common axis 13.

Referring to FIG. 1, a switch 28 is secured to rigid member 14 by bracket 30 and fastener 31. In turn, rigid member 14 is secured to the lower housing 20 by support 32. Similarly, rigid member 15 is secured to the upper housing 18 by support 34. Switch assembly 16 further includes a mechanical stop comprising limit screw 36 and stop 37. The mechanical stop acts to prevent deformation of leaf springs 22, 23 in the event of significant movement between gauge balls 11, 12. The switch 28 can be any commercially available precision contact switch which is compatible with the coordinate measuring machine probe input such as those commercially available under the brand name Baumer My-Com.

Since upper and lower housing members 18, 20 are isolated from switch 28, they can be constructed of any suitable lightweight material such as rigid plastic or aluminum, and need not have a low coefficient of thermal expansion. However, bracket 30 should be constructed of a material having a low coefficient of thermal expansion since it comprises a portion of the ball bar length which must be accurately determined.

Switch assembly 16 should be positioned as near as conveniently possible to either one or the other of the two gauge balls 11, 12. This serves to reduce bending movement in the switch assembly 16, thereby improving the accuracy of the ball bar 10.

In operation, ball bar 10 is positioned with gauge ball 11 secured in magnetic socket assembly 38 and gauge ball 12 secured in magnetic socket assembly 40 as shown in FIG. 3. Magnetic socket assembly 38 is secured to the workpiece table 41 of the coordinate measuring machine, while magnetic socket assembly 40 is secured to the coordinate measuring machine arm 42 where normally there would be a touch probe.

Figure 4:
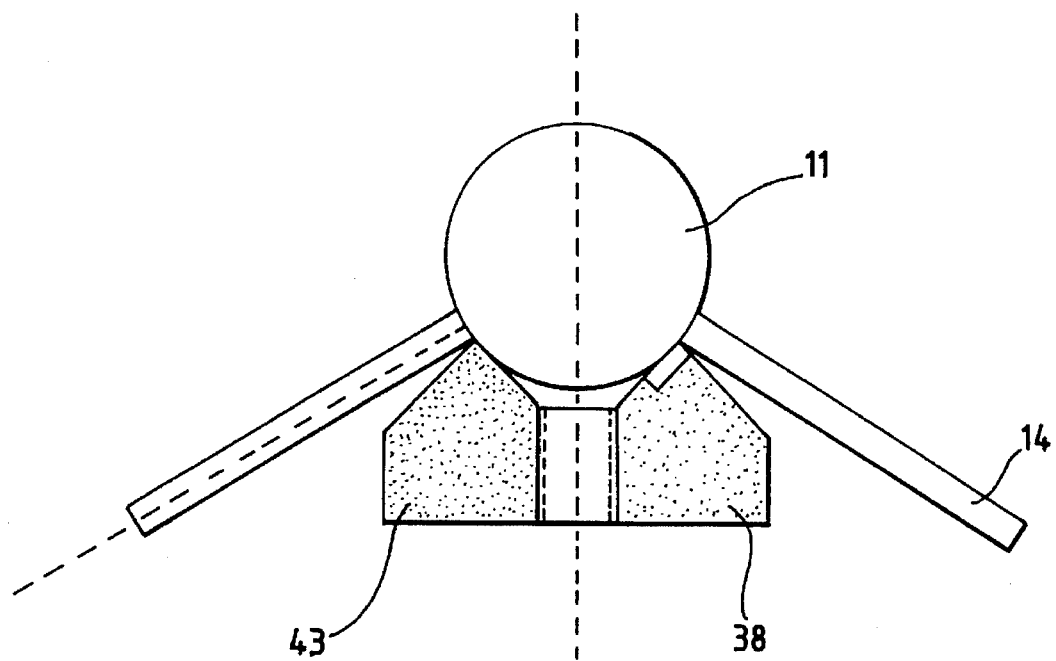
FIG. 4 is a side elevation view of a magnetic socket assembly.
Figure 5:
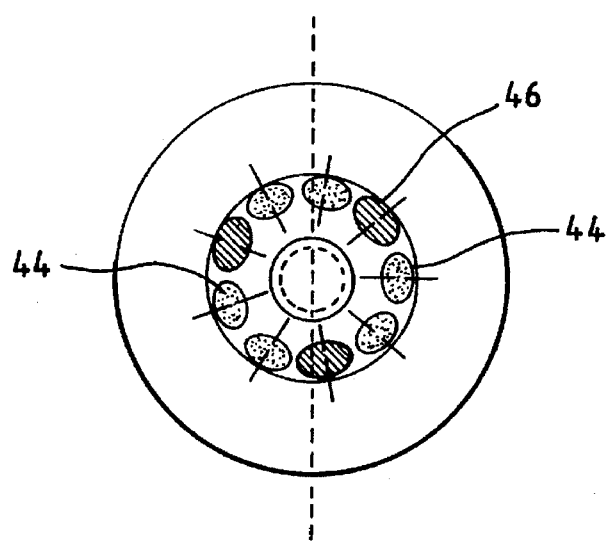
FIG. 5. is a top elevation view of the magnetic socket assembly of FIG. 4.

As shown in FIGS. 4 and 5, magnetic socket assemblies 38, 40 comprise a base 43 which includes a plurality of rare earth magnets 44 and brass pads 46. As shown in FIG. 4, gauge balls 11, 12 rest on brass pads 46. Magnets 44 are recessed to provide a small air gap to avoid scratching the gauge balls 11, 12. These magnetic socket assemblies 38, 40 provide positive location without damage to the precision gauge balls 11, 12.

Once in position, the coordinate measuring machine is operated in the same manner as during a normal measurement cycle. The calibration program roughly positions the moving gauge ball 12 along a set of locations which lie generally on the surface of a sphere centered about the center of the fixed gauge ball 11, having a radius approximate to the length of the ball bar. At each location, the calibration program places the center of the moving gauge ball 12 just slightly outside the imaginary sphere, then proceeds radially inward until the switch tip 48 contacts the end surface 50 of rigid member 15. Upon activation, the switch signals the coordinate measuring machine arm to halt, and signals the coordinate measuring machine controller to record the position of the coordinate measuring machine arm.

The center-to-center gauge ball distance derived from the position data of the coordinate measuring machine can then be compared to the actual ball bar 10 length as measured from the center of gauge ball 11 to the center of gauge ball 12 during switch activation.

A primary advantage of the present calibration system is its simplified connection scheme. The switch cable is merely connected to the coordinate measuring machine controller in place of the touch probe. Existing ball bar calibration systems require the arm of the coordinate measuring machine to be programmed to accurately position itself along a predetermined path while data is collected separately from transducers within the ball bar itself. However, with the disclosed ball bar system, the coordinate measuring machine can be operated normally. The disclosed ball bar need only be approximately positioned by an operator. This feature has the added advantage of providing an automatic learn mode within the calibration software. After approximate location of the ball bar by the operator, the controller can automatically signal the coordinate measuring machine arm to make an iterative series of incremental movements to find the center of the stationary gauge ball and the ball bar attitude. From this information, a spherical path can be generated, and a calibration routine executed. Thus, no operator intervention is required until the measurements are complete and the coordinate measuring machine error analyzed.

The present automatic ball bar calibration apparatus and method for a coordinate measuring machine calibration provide a simpler construction and greater accuracy than previous systems. It is expected that this apparatus will typically be more efficient than prior apparatus, and will cost less, and require less time to operate. The need for the coordinate measuring machine to accurately position itself in a predetermined location has been eliminated. Furthermore, the disclosed apparatus and method do not require a second computer or data input device. The switch cable is merely connected to the coordinate measuring machine controller in place of the touch probe.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An apparatus for determining the accuracy of a coordinate measuring machine having at least one servo drive, the apparatus comprising:

(a) a first gauge ball;

(b) a second gauge ball;

(c) a telescoping switch assembly positioned between the first gauge ball and the second gauge ball, the switch assembly including a switch and upper and lower housings movably secured to one another, said upper and lower housing being secured to said first and second gauge balls, respectively, at least one of said upper and lower housings being movably secured to said switch to activated said switch when moved radially relative to said switch;

(d) a first magnetic socket assembly for securing the first gauge ball such that the center of the first gauge ball is maintained at a fixed location with respect to a coordinate measuring machine; and (e) a second magnetic socket assembly for securing the second gauge ball such that the center of the second gauge ball is directed by the coordinate measuring machine to move radially inward from a point beyond the radial distance between the center of the first gauge ball and the center of the second gauge ball until the switch is activated;

whereby a position of the coordinate measuring machine is determined upon activation of the switch and compared to the radial distance between the center of the first gauge ball and the center of the second gauge ball such that the accuracy of the coordinate measuring machine is determined.

2. An apparatus according to claim 1, wherein said telescoping switch assembly further comprises first and second rigid members secured to said first and second gauge balls, respectively, said switch being secured to said first rigid member and activating when said first and second rigid members move radially relative to one another until said second rigid member contacts said switch.

3. An apparatus according to claim 1, further comprising:

first and second rigid members secured to said first and second gauge balls; and a bracket securing said first rigid member to said switch, said second rigid member activity said switch when said first and second rigid members moving radially with respect to one another.

4. An apparatus according to claim 1, wherein said telescoping switch assembly includes:

leaf springs mounting said upper and lower housing members to one another; and first and second rigid members secured to said first and second gauge balls, respectively, and to said upper and lower housing members, respectively.

5. An apparatus according to claim 4, wherein said leaf springs include openings allowing said first and second rigid members to pass through without contact.

6. A method for determining the accuracy of a coordinate measuring machine having at least one servo drive, comprising the steps of:

(a) providing a telescoping switch assembly positioned between a first gauge ball and a second gauge ball, the switch assembly including a switch and upper and lower housings movably secured to one another, said upper and lower housing being secured to said first and second gage balls, respectively, at least one of said upper and lower housings being movably secured to said switch to activate said switch when moved radially relative to said switch;

(b) securing the first gauge ball in a first magnetic socket assembly such that the center of the first gauge ball is maintained at a fixed location with respect to a coordinate measuring machine;

(c) securing the second gauge ball in a second magnetic socket assembly such that the center of the second gauge ball is directed by the coordinate measuring machine to move radially inward from a point beyond the radial distance between the center of the first gauge ball and the center of the second gauge ball until the switch is activated; and, (d) determining a position of the coordinate measuring machine upon activation of the switch and comparing the coordinate position to the radial distance between the center of the first gauge ball and the center of the second gauge ball such that the accuracy of the coordinate measuring machine is determined.

7. A method according to claim 6, further comprising the steps of:

securing first and second rigid members to the first and second gage balls, respectively;

securing the switch to the first rigid member; and activating the switch when the first and second rigid members move radially relative to one another until the second rigid member contacts the switch.

8. A method according to claim 6, further comprising the steps of:

securing first and second rigid members to the first and second gauge balls; and securing the first rigid member to the switch through a bracket; and activating the switch by the second rigid member when the first and second rigid members move radially with respect to one another.

9. A method according to claim 6, further comprising the steps of:

mounting leaf springs between the upper and lower housing members to isolate the housing members from the switch and to allow radially motion between the upper and lower housing members; and securing the first and second rigid members to the first and second gage balls, respectively and to the upper and lower housing members, respectively.

10. A method according to claim 9, further comprising the step of providing an opening through the leaf springs to allow the first and second rigid members to pass through without contact.

* * * * *